(12) United States Patent
Kim et al.

(10) Patent No.: US 7,250,696 B2
(45) Date of Patent: Jul. 31, 2007

(54) LINEAR MOTOR AND X-Y STAGE

(75) Inventors: Houng Joong Kim, Hitachi (JP); Keijiro Sakai, Kanasago (JP); Hitoshi Shibata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 249 days.

(21) Appl. No.: 10/920,450

(22) Filed: Aug. 18, 2004

(65) Prior Publication Data
US 2005/0104454 A1 May 19, 2005

(30) Foreign Application Priority Data
Nov. 18, 2003 (JP) ............................. 2003-387344

(51) Int. Cl.
*H02K 41/03* (2006.01)
(52) U.S. Cl. ........................................ 310/12
(58) Field of Classification Search ............ 310/12–15; 318/134
See application file for complete search history.

(56) References Cited

U.S. PATENT DOCUMENTS

| | | | | |
|---|---|---|---|---|
| 4,241,268 A | * | 12/1980 | Popov et al. .................. 310/13 |
| 6,448,733 B1 | * | 9/2002 | Joong et al. ................ 318/649 |
| 6,541,880 B2 | * | 4/2003 | Okada et al. .................. 310/12 |
| 6,548,919 B2 | * | 4/2003 | Maki et al. .................... 310/12 |
| 6,548,920 B2 | * | 4/2003 | Joong et al. ................... 310/12 |
| 6,570,274 B2 | * | 5/2003 | Kim et al. ..................... 310/12 |
| 6,753,627 B2 | * | 6/2004 | Kim et al. ..................... 310/12 |
| 6,876,108 B2 | * | 4/2005 | Maki et al. .................... 310/12 |
| 6,943,465 B2 | * | 9/2005 | Kim et al. ..................... 310/12 |
| 6,975,048 B2 | * | 12/2005 | Kim et al. ..................... 310/12 |
| 7,004,694 B2 | * | 2/2006 | Kim et al. ..................... 410/12 |

FOREIGN PATENT DOCUMENTS

| | | | | |
|---|---|---|---|---|
| JP | 10-327571 | * | 12/1998 | ................ 310/12 |
| JP | 2001-028875 | | 1/2001 | |

* cited by examiner

*Primary Examiner*—Tran Nguyen
(74) *Attorney, Agent, or Firm*—Crowell & Moring LLP

(57) ABSTRACT

A linear motor for generating a linear motion in a linear direction, has a plurality of first members, each of which includes an electromagnetic coil for generating a first magnetic field, and a magnetic core (magnetically permeable) having magnetic surfaces being opposite to each other so that the first magnetic field passes a space between the magnetic surfaces, and a second member arranged in the spaces to be relatively movable linearly with respect to a combination of the first members to generate the linear motion in the linear direction, and including a magnet polarized in a polarizing direction to generate a second magnetic field.

17 Claims, 4 Drawing Sheets

COMBINATIONS FOR THREE PHASES

LINEAR MOTOR AND X-Y STAGE

BACKGROUND OF THE INVENTION

The present invention relates to a linear motor and X-Y stage including the linear motor.

JP-A-2001-28875 discloses a linear motor in which a plurality of armatures are magnetically energized by a single coil and magnetic polarities of the armatures adjacent to each other are inverted with respect to each other.

BRIEF SUMMARY OF THE INVENTION

An object of the present invention is to provide a linear motor and X-Y stage including the linear motor, in which linear motor a distance between armatures is decreased to decrease a length of the linear motor.

According to the invention, a linear motor for generating a linear motion in a linear direction, comprises, a plurality of first members, each of which includes an electromagnetic coil for generating a first magnetic field, and a magnetic core (magnetically permeable) having magnetic surfaces being opposite to each other so that the first magnetic field passes a space between the magnetic surfaces, and a second member arranged in the spaces to be relatively movable linearly with respect to a combination of the first members to generate the linear motion in the linear direction, and including a (preferably permanent) magnet polarized in a polarizing direction to generate a second magnetic field, wherein energizing phases of the electromagnetic coils are differentiated from each other in such a manner that a mutual interaction between each of the first magnetic fields and the second magnetic field generates a relative movement between the combination of the first members and the second member in the linear direction.

If at least a part of the electromagnetic coil and the magnet are prevented from overlapping each other as seen in the polarizing direction, the at least a part of the electromagnetic coil can be arranged at either of sides of the magnet or second member as seen in the polarizing direction, so that the electro-magnetic coil can extend in a wide range not limited by a width of the magnet or second member as seen in the polarizing direction to decrease a radial thickness of the electromagnetic coil. If the at least a part of the electromagnetic coil and the magnet are capable of overlapping each other at least partially as seen in another direction perpendicular to the polarizing direction (and to the linear direction), the electromagnetic coil can extend in the wide range not limited by the width of the magnet or second member as seen in the polarizing direction to decrease the radial thickness of the electromagnetic coil. If a coil axis around which the at least a part of the electromagnetic coil extends (for example, symmetrically with respect to the coil axis) is prevented from extending perpendicularly to the polarizing direction (and to the linear direction), the at least a part of the electromagnetic coil can be arranged at either of the sides of the magnet or second member as seen in the polarizing direction, so that the electromagnetic coil can extend in the wide range not limited by the width of the magnet or second member as seen in the polarizing direction to decrease the radial thickness of the electromagnetic coil. In this case, it is preferable for further increasing the range in which the electromagnetic coil can extend that the at least a part of the electromagnetic coil is at least partially prevented from overlapping the magnet as seen in the polarizing direction.

If the magnet and each of two parts of the electromagnetic coil are prevented from overlapping each other as seen in a direction perpendicular to the linear direction (for example, as seen in the polarizing direction), and the two parts of the electromagnetic coil are capable of being opposite or facing to each other through the magnet (for example, in a direction perpendicular to the linear direction and the polarizing direction) as seen in the direction (for example, as seen in the polarizing direction), the two parts of the electromagnetic coil are arranged at the respective sides of the magnet or second member as seen in the polarizing direction, so that the electromagnetic coil can extend in the wide range not limited by the width of the magnet or second member as seen in the polarizing direction to decrease a radial thickness of the electromagnetic coil. If the magnet and each of two parts of the electromagnetic coil are capable of overlapping each other at least partially as seen in a direction perpendicular to the polarizing direction (for example, as seen in the direction perpendicular to the polarizing direction and the linear direction), the two parts of the electromagnetic coil are arranged at the respective sides of the magnet or second member as seen in the polarizing direction.

When coil axes around which the two parts of the electromagnetic coil extend respectively (for example, symmetrically with respect to the respective coil axes) are prevented from being coaxial (with respect to each other), and as seen in the direction perpendicular to the linear direction (for example, as seen in the polarizing direction), the magnet and each of the two parts of the electromagnetic coil are prevented from overlapping each other, the two parts of the electromagnetic coil are arranged at the respective sides of the magnet or second member as seen in the polarizing direction.

If the coil axes around which the two parts of the electromagnetic coil extend respectively (for example, symmetrically with respect to the respective coil axes) are prevented from being coaxial (with respect to each other), and the two parts of the electromagnetic coil overlap each other at least partially as seen in a direction perpendicular to the linear direction (for example, the direction perpendicular to the linear direction and the polarizing direction), the two parts of the electromagnetic coil are arranged at the respective sides of the magnet or second member as seen in the direction perpendicular to the linear direction.

If the coil axes around which the two parts of the electromagnetic coil extend respectively (for example, symmetrically with respect to the respective coil axes) are prevented from being coaxial (with respect to each other), and the two parts of the electromagnetic coil are capable of being opposite to each other through the magnet (for example, in a direction perpendicular to the linear direction and the polarizing direction) as seen in the direction perpendicular to the linear direction (for example, as seen in the polarizing direction), the two parts of the electromagnetic coil are arranged at the respective sides of the magnet or second member as seen in the direction perpendicular to the linear direction. In this case, if the parts of the electromagnetic coil and the magnet are arranged to include a common imaginary straight line as seen in the linear direction, the parts of the electromagnetic coil can be easily wound around respective portions of the magnetic core through the space.

If the coil axes around which the two parts of the electromagnetic coil extend respectively (for example, symmetrically with respect to the respective coil axes) are prevented from being coaxial (with respect to each other), and the two parts of the electromagnetic coil are capable of being opposite to each other in the direction perpendicular to the linear direction (for example, the direction perpendicular to the linear direction and to the polarizing direction) as seen in another direction perpendicular to the direction (for example, as seen in the polarizing direction), the two parts of the electromagnetic coil are arranged at the respective sides of the magnet or second member as seen in the direction perpendicular to the linear direction.

If the coil axes around which two parts of the electromagnetic coil extend respectively (for example, symmetrically with respect to the respective coil axes) are prevented from being coaxial (with respect to each other), and the magnet and each of two parts of the electromagnetic coil are capable of overlapping each other at least partially as seen in a direction perpendicular to the linear direction (for example, as seen in the direction perpendicular to the linear direction and the polarizing direction), the two parts of the electromagnetic coil are arranged at the respective sides of the magnet or second member as seen in the direction perpendicular to the linear direction.

If the coil axes around which two parts of the electromagnetic coil extend respectively (for example, symmetrically with respect to the respective coil axes) are prevented from being coaxial (with respect to each other), and the coil axes are symmetric with respect to the direction perpendicular to the linear direction (for example, a direction parallel to the polarizing direction), two parts of the magnetic core surrounded by the two parts of the electromagnetic coil respectively can be symmetric or common in shape with respective to the direction.

If the two parts of the electromagnetic coil of each of the first members are capable of being arranged at respective sides of the magnet as seen in the direction perpendicular to the linear direction (for example, as seen in the polarizing direction) so that the parts of the electromagnetic coils of the first members are arranged in a staggered manner along an imaginary straight line parallel to the linear direction, the electromagnetic coils can fill effectively a space as seen in the direction.

If the magnetic core of each of the first members includes first and second magnetic core parts (discrete or separable from each other before assembling the first member) surrounded by respective parts of the electromagnetic coil, coil axes around which the parts of the electromagnetic coil extend respectively (for example, symmetrically with respect to the respective coil axes) are prevented from being coaxial (with respect to each other), and one (each) of the first and second magnetic core parts and one (corresponding one) of the parts of the electromagnetic coil surrounding the other one (the corresponding other one) of the first and second magnetic core parts overlap each other at least partially as seen in the direction perpendicular to the linear direction (for example, as seen in the direction perpendicular to the linear direction and the polarizing direction), the electromagnetic coils can fill effectively a space other than the first and second magnetic core parts as seen in the direction.

If the magnetic core of each of the first members includes first and second magnetic core parts (discrete or separable from each other before assembling the first member) surrounded by respective parts of the electromagnetic coil, coil axes around which the parts of the electromagnetic coil extend respectively (for example, symmetrically with respect to the respective coil axes) are prevented from being coaxial (with respect to each other), and the first and second magnetic core parts of the magnetic core of each of the first members are prevented from overlapping each other at least partially as seen in the direction perpendicular to the linear direction and the polarizing direction, the first and second magnetic core parts may be discrete or separable from each other before assembling the first member so that the parts of the electromagnetic coil can be easily wound around the first and second magnetic core parts respectively while the first and second magnetic core parts are separated from each other.

If the coil axes around which two parts of the electromagnetic coil extend respectively (for example, symmetrically with respect to the respective coil axes) are prevented from being coaxial (with respect to each other), and are distant from each other in at least one of the linear direction and a direction perpendicular to the linear direction (for example, in at least one or both of the linear direction and a direction perpendicular to the linear direction and the polarizing direction), the two parts of the electromagnetic coil can effectively fill a space as seen in the direction perpendicular to the linear direction (for example, as seen in the polarizing direction).

If a part of the electromagnetic coil of one of the first members is prevented from being adjacent to (and coaxial with) another part of the electromagnetic coil of the one of the first members in the linear direction, and is adjacent to a part of the electromagnetic coil of the other one of the first members in the linear direction, which part of the electromagnetic coil of the other one of the first members is prevented from being adjacent to another part of the electromagnetic coil of the other one of the first members in the linear direction while coil axes around which the parts of the electromagnetic coils of the first members extend respectively are prevented from being coaxial, the parts of the electromagnetic coils can be distributed to fill effectively a space or minimize a distance between the parts of the electromagnetic coil in the linear direction as seen in the direction perpendicular to the linear direction (for example, as seen in the polarizing direction).

When the magnetic core of each of the first members includes first and second magnetic core parts surrounded by respective parts of the electromagnetic coil, a pitch between the first and second magnetic core parts distant from each other in the linear direction in each of the first members is P, a number of phases differentiated from each other to electrically energize respectively the electromagnetic coils of the first members is M, and k is a counting number, a distance between the first members adjacent to each other in the linear direction is calculated from the following formula, $$k \cdot P + P/M.$$

A X-Y stage for driving an object, comprises, a first linear motor for driving the object in X-direction, and a second linear motor for driving the object in Y-direction, wherein each of the first and second linear motors for generating a linear motion in a linear direction, includes, a plurality of first members, each of which includes an electromagnetic coil for generating a first magnetic field, and a magnetic core (magnetically permeable) having magnetic surfaces being opposite to each other so that the first magnetic field passes a space between the magnetic surfaces, and a second member arranged in the spaces to be relatively movable linearly with respect to a combination of the first members to generate the linear motion in the linear direction, and including a magnet polarized in a polarizing direction to generate a second magnetic field.

Other objects, features and advantages of the invention will become apparent from the following description of the embodiments of the invention taken in conjunction with the accompanying drawings.

DETAILED DESCRIPTION OF THE INVENTION

In FIGS. 4-7, a structure of a linear motor of a sample to be compared is shown. In this sample, A phase armature unit 7, B phase armature unit 8 and C phase armature unit 9 whose bottoms are surrounded by coils are combined to form a first side member.

Figure 2:
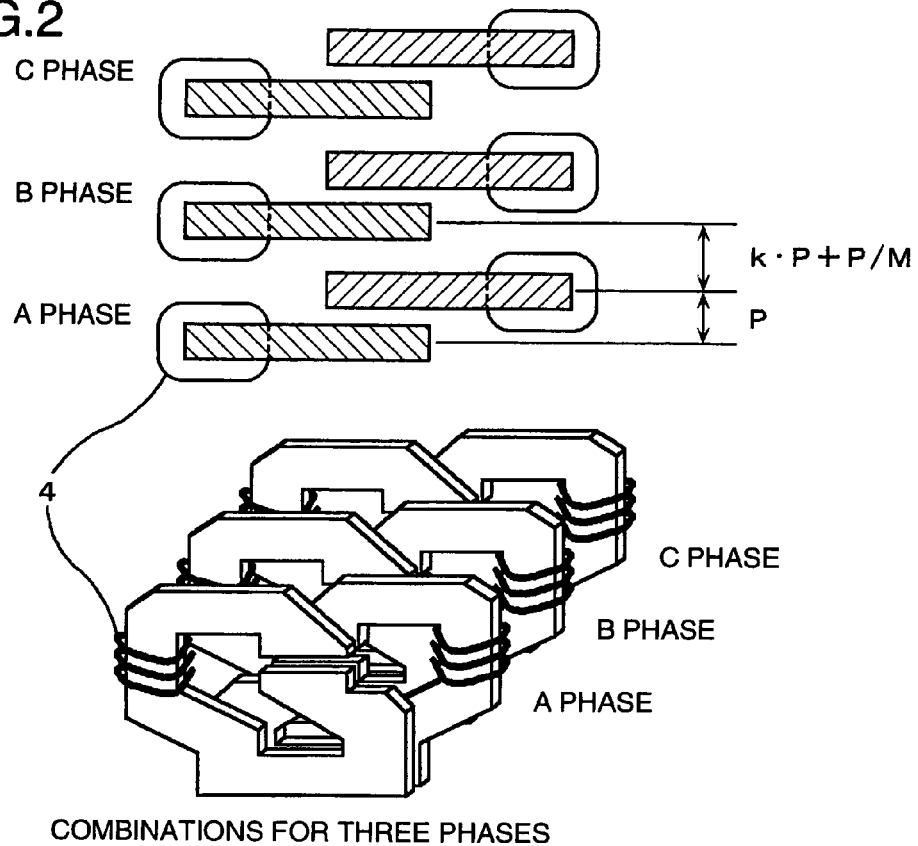
FIG. 2 is a view showing armature elements of three phases for the linear motor as the embodiment of the invention.
Figure 5:
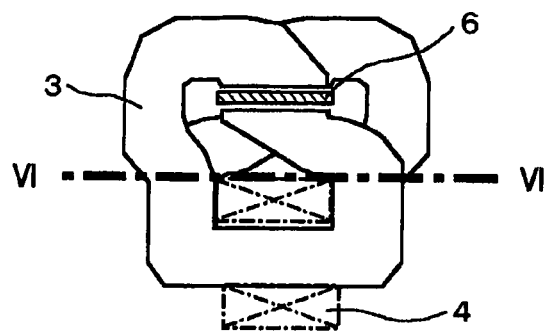
FIG. 5 is a view showing elements forming another linear motor as another sample to be compared with the embodiment of the invention.
Figure 6:
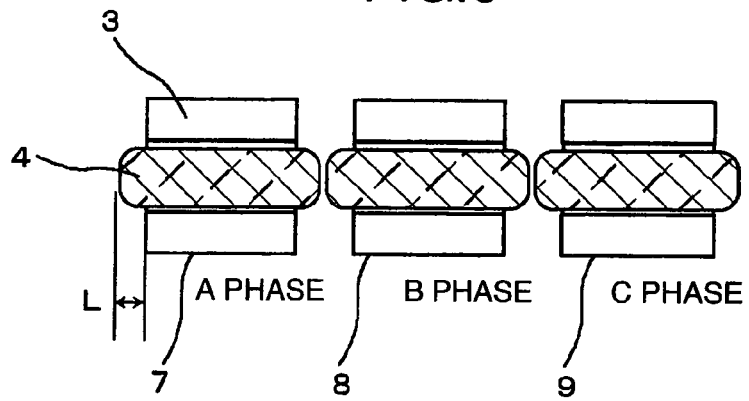
FIG. 6 is a cross sectional view taken along a line VI-VI of gig. 5.
Figure 7:
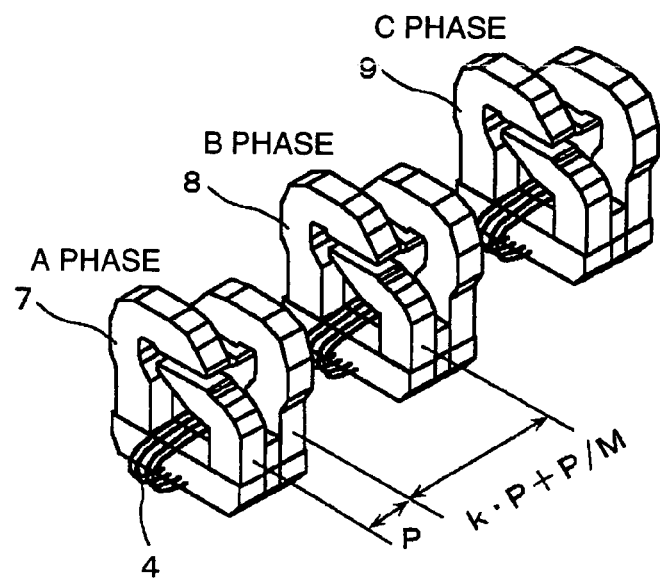
FIG. 7 is a view showing an arrangement of armatures of the another linear motor.

Similarly to FIG. 2, a predetermined distance between the armatures different in phase needs to be kept. When a pole pitch of the armatures of the linear motor is P, a pitch (k·P+P/M) between magnetic pole teeth of the armatures adjacent to each other and different from each other in phase needs to be kept (k=0, 1, 2, . . . , M=2, 3, 4 . . . , k may be selected in a range in which the armatures can be arranged, and M is a number of phases of the motor.) In FIG. 5, when a length of a coil end is L, a distance between the armatures different in phase (for example, between A and B phases, and B and C phases) needs to be not less than 2L. A coil design is limited so that the coil ends of the armatures different in phase are received by these distances.

Figure 4:
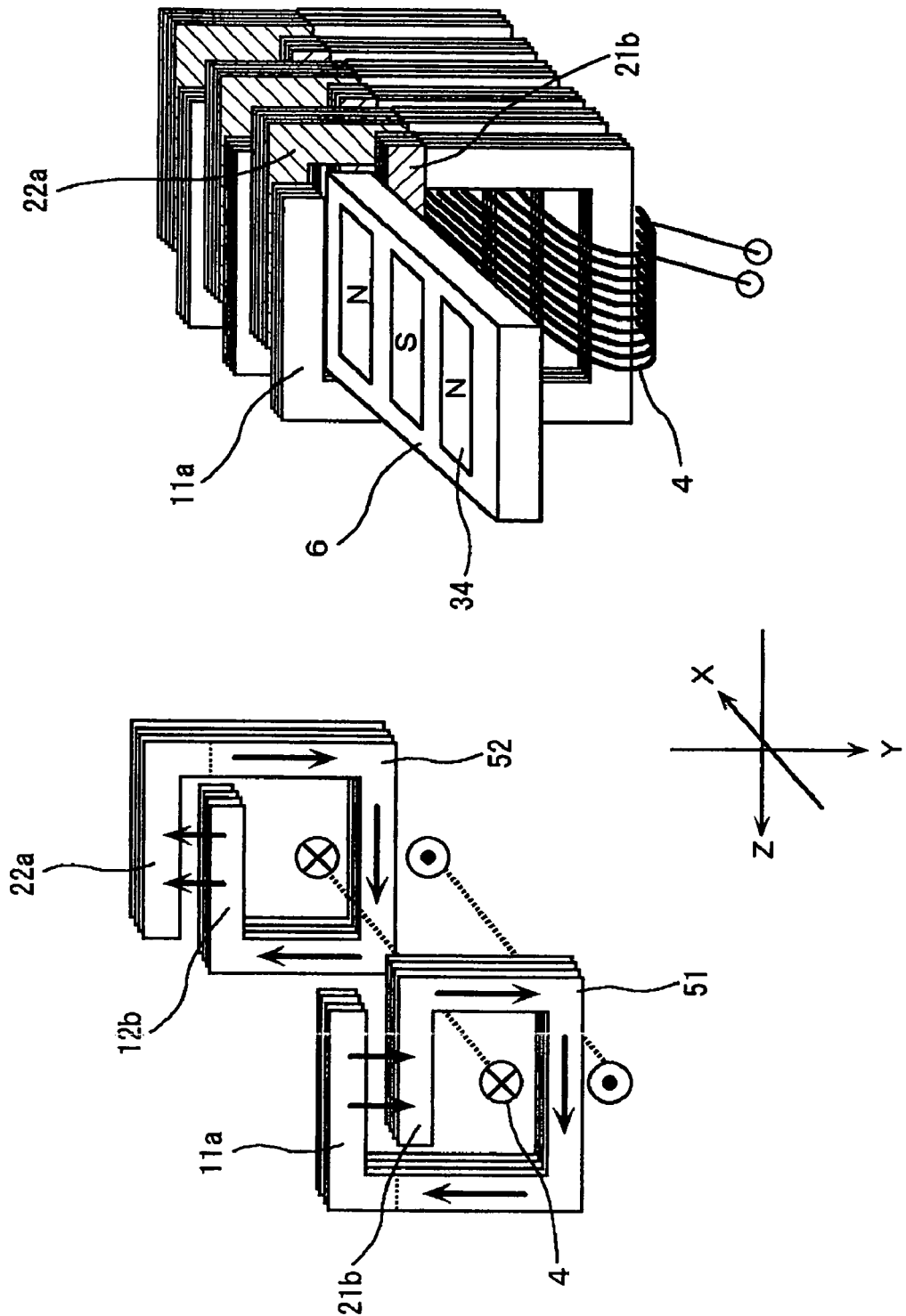
FIG. 4 is a view showing elements forming a linear motor as a sample to be compared with the embodiment of the invention.

In FIG. 4, a linear motor is shown as a sample to be compared. FIG. 4 shows that in the linear motor having a plurality of the armatures including cores and coils, the cores are formed by coil cores holding the coils and magnetic pole cores facing to front and back sides of a magnetic pole of second side, a core assembly includes a plurality of magnetic polarities for single phase by a common single coil.

FIG. 4 shows a flow of magnetic flux in the linear motor, and a whole of the linear motor. A plurality of permanent magnets 34 with polarities thereof are inverted alternately are arranged to form a second side member 6. Armatures 3 correspond to a first side member of the linear motor (side including a magnetic member surrounded by a coil) formed by cores 51 and 52 and an armature coil 4.

The cores 51 and 52 are made of magnetic material, and formed in such a manner that upper and lower poles are inverted alternately. The second side member 6 is surrounded by the cores 51 and 52. Here, a first facing portion is formed by upper and lower magnetic pole teeth 11a and 21b, and a second facing portion is formed by lower and upper magnetic pole teeth 12b and 22a. Therefore, a core of (2n−1)th is the first facing portion, and a core of (2n)th is the second facing portion (incidentally, n=1, 2, 3, . . . ) so that the armature 3 is formed. A constant gap is formed between the upper and lower magnetic pole teeth of each of the facing portions of the cores 51 and 52, and the second side member 6 is inserted in the gap, so that the second side member 6 is arranged in the first and second facing portions. By flowing an alternating current of single phase through the coil 4 in accordance with a positional relationship between the second side member 6 and the armature 3, the magnetic flux passes alternately the gap between the upper and lower magnetic pole teeth in each of the facing portions so that directions of the magnetic fluxes flowing in the first and second facing portions are inverted alternately. A mutual interaction between the magnetic fluxes flowing in the first and second facing portions and the magnetic flux generated by the permanent magnet 34 generates a driving force of electromagnetic force on the second side member 6 in X direction, so that the second side member 6 reciprocates. In this case, the second side member 6 is surrounded by the cores 51 and 52.

Figure 1:
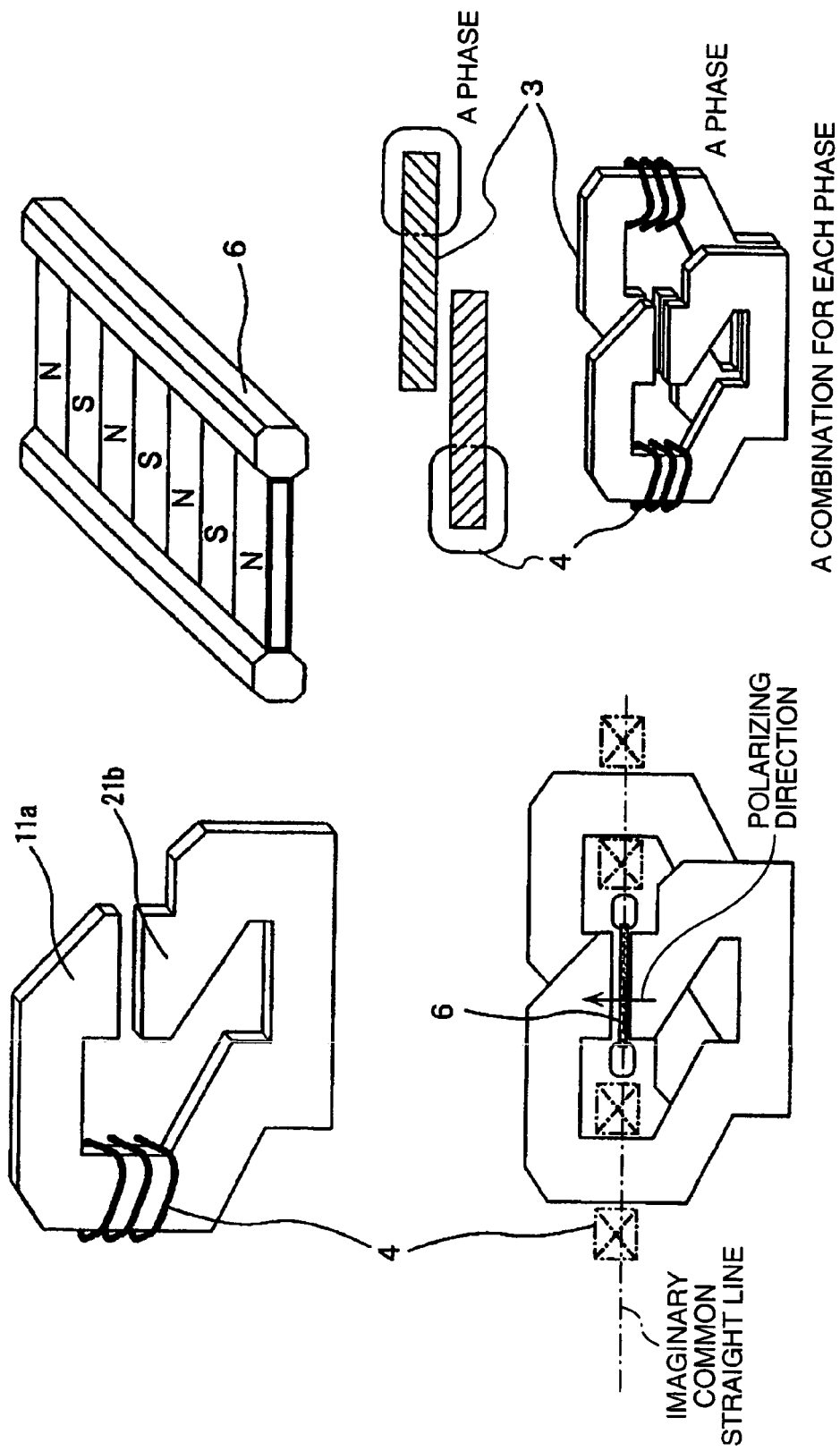
FIG. 1 is a view showing elements forming a linear motor as an embodiment of the invention.

FIG. 1 shows an embodiment of a linear motor of the invention. In FIG. 1, the magnetic pole of the armature 3 is surrounded by the coil 4, a plurality of the armatures 3 are connected to form the first side, and the second side member 6 is movably supported by a bearing or the like. The coil 4 extends at a side of the second side member 6. The coil 4 is arranged at a position which is prevented from being passed by the direction of the magnetic pole of the second side member (in FIG. 4, Y direction), and preferably at the same position as the second side member 6 in vertical direction (the direction of the magnetic pole of the second side member, in FIG. 4, Y direction).

The core of the armature is formed by a coil core with the coil 4 thereon and a magnetic pole core facing to the front and rear portions of the second side member 6. The coils of the respective magnetic poles are distant from each other, and magnetically energizing conditions for respective phases are equal to each other with non-problem for a normal operation.

Further, it is an effective means for producing an ultra-small linear motor for generating an extremely small driving force.

FIG. 2 shows an arrangement of armature coils for three phases in the embodiment of the invention. As shown in FIG. 2, when the pole pitch of the armatures of the linear motor is P, the pitch (k·P+P/M) between the magnetic pole teeth of the armatures adjacent to each other and different from each other in phase needs to be kept (k=0, 1, 2, . . . , M=2, 3, 4 . . . , k may be selected in the range in which the armatures can be arranged, and M is the number of phases of the motor.) The coil design is done so that the coil ends of the armatures adjacent to each other are received by these distances.

A difference between the coil arrangement of the sample as shown in FIG. 5 to be compared and the coil arrangement of the embodiment of the invention as shown in FIG. 2 is described. When the pole pitch of the armatures of the linear motor is P, the pitch (k·P+P/M) between the magnetic pole teeth of the armatures adjacent to each other and different from each other in phase needs to be kept. In the coil arrangement as shown in FIG. 5, since the coil ends of the armature coils of the armatures different in phase (for example 7, 8) are adjacent to each other, (k·P+P/M) becomes great. On the contrary, by using the coil arrangement of the embodiment as shown in FIG. 2, since the coil ends of the armature coils of the armatures different in phase are not adjacent to each other, (k·P+P/M) becomes smaller in comparison with the coil arrangement as shown in FIG. 5.

As a result, in the linear motor of the embodiment, the distance between the armatures different in phase and adjacent to each other is decreased to shorten a length of the linear motor.

Figure 3:
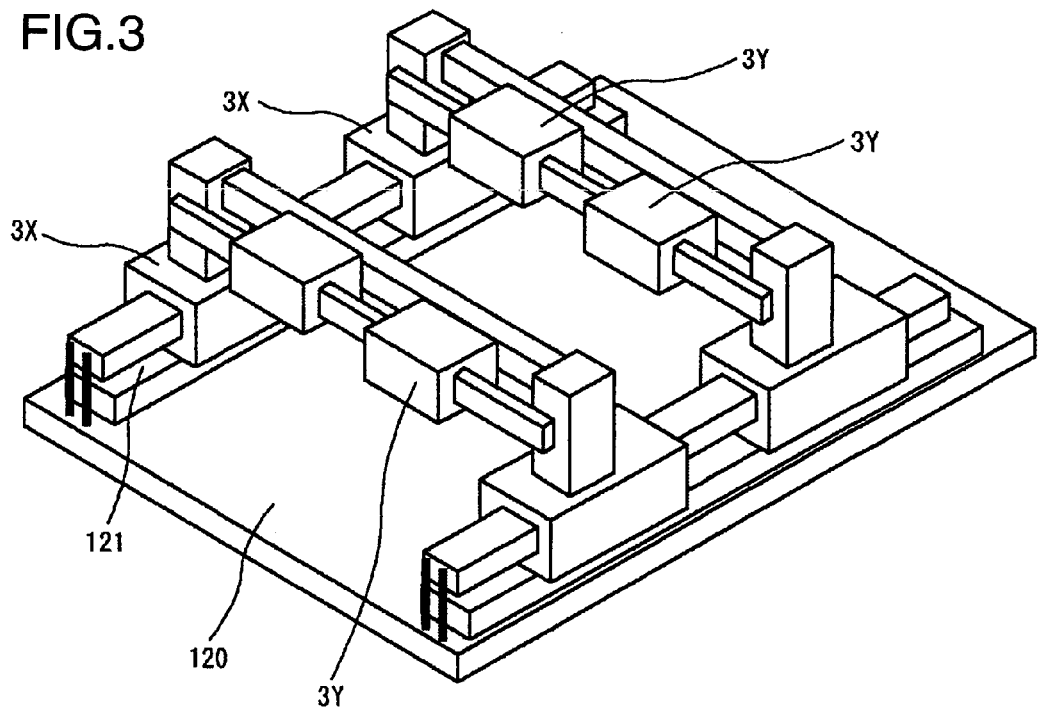
FIG. 3 is a schematic view showing X-Y stage of the invention.

FIG. 3 shows an X-Y stage using a driving device of the invention. In FIG. 3, armatures 3X and 3Y form a three-phases driving device including the three armatures of A, B and C phases as shown in FIG. 2. As a matter of course, a two or five phases driving device is obtainable.

In FIG. 3, 3X denotes the armature 3 of an X direction driving device, and 3Y denotes the armature 3 of a Y direction driving device. A linear guide mechanism (linear bearing) 121 is arrange on a base 120 of the X-Y stage so that the armature 3X of the X direction driving device is freely movable. Further, also in Y. axis, a linear guide mechanism (linear bearing) 121 is arrange so that the armature 3Y of the Y direction driving device is freely movable. On the base 120, another X-Y stage (not shown) for X direction driving or Y-Y driving may be used to fix a work to be moved for micro-movement.

By this embodiment, in the linear motor of the embodiment, the distance between the armatures different in phase and adjacent to each other is decreased to shorten a length of the linear motor.

In FIG. 3, when a single common secondary conductive member drives a plurality of the armatures 3Y (multi-driving type), a length of each of the armatures is decreased to increase an effective stroke of each of the armatures.

Further, in this embodiment, when a single common secondary conductive member drives a plurality of the armatures (multi-driving type), a length of each of the armatures is decreased to increase the effective stroke.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A linear motor for generating a motion in a linear direction, comprising:
   a plurality of first members, each of which includes an electromagnetic coil for generating a first magnetic field, and a magnetic core having a gap between magnetic surfaces that are opposite to each other, so that the first magnetic field passes through the gap between the magnetic surfaces; and
   a second member which is arranged in the gaps of the respective first members, and is movable linearly relative to the first members to generate the motion in the linear direction, said second member including a magnet that is polarized in a polarizing direction to generate a second magnetic field; wherein,
   the electromagnetic coil of each of said first members has two parts which are situated away from each other on the magnetic core;
   the magnet of said second member and each of the two parts of the electromagnetic coil of each of said first members are disposed such that they cannot overlap each other in a further direction perpendicular to the linear direction; and
   the two parts of the electromagnetic coil are positionable opposite each other through the magnet, as seen in the further direction.

2. A linear motor according to claim 1, wherein the magnet of said second member and each of two parts of the electromagnetic coil of each first member are capable of overlapping each other, at least partially, as seen in a direction perpendicular to the polarizing direction.

3. A linear motor according to claim 1, wherein coil axes around which the two parts of the electromagnetic coil of each first member extend respectively, are prevented from being coaxial.

4. A linear motor according to claim 1, wherein;
   coil axes around which the two parts of the electromagnetic coil of each first member extend respectively, are prevented from being coaxial; and
   the two parts of said electromagnetic coil overlap each other at least partially as seen in another direction that is perpendicular to the linear direction and the further direction.

5. A linear motor according to claim 1, wherein the parts of the electromagnetic coil and the magnet are arranged to include a common imaginary straight line as seen in the linear direction.

6. A linear motor according to claim 1, wherein:
   coil axes around which the two parts of the electromagnetic coil of each first member extend respectively, are prevented from being coaxial; and
   the magnet and the each of two parts of said electromagnetic coil are capable of overlapping each other at least partially as seen in another direction perpendicular to the linear direction and the further direction.

7. A linear motor according to claim 1, wherein:
   coil axes around which the two parts of the electromagnetic coil of each first member extend respectively, are prevented from being coaxial; and
   the coil axes are symmetric with respect to the further direction.

8. A linear motor according to claim 1, wherein the two parts of the electromagnetic coil of each of the first members are positionable at respective sides of the magnet as seen in the further direction so that the parts of the electromagnetic coils of the first members are arranged in a staggered manner along an imaginary straight line parallel to the linear direction.

9. A linear motor according to claim 1, wherein:
   the magnetic core of each of the first members includes first and second magnetic core parts surrounded respectively by the parts of the electromagnetic coil;
   coil axes around which the parts of the electromagnetic coil of each first member extend respectively, are prevented from being coaxial and
   one of the first and second magnetic core parts and one of the parts of the electromagnetic coil surrounding the other one of the first and second magnetic core parts overlap each other at least partially as seen in another direction that is perpendicular to the linear direction and to the further direction.

10. A linear motor according to claim 1, wherein:
    the magnetic core of each of the first members includes first and second magnetic core parts surrounded respectively by the parts of the electromagnetic coil;
    coil axes around which the parts of the electromagnetic coil of each first member extend respectively, are prevented from being coaxial; and
    the first and second magnetic core parts of the magnetic core of each of the first members are prevented from overlapping each other as seen in another direction that is perpendicular to the linear direction and to the polarizing direction.

11. A linear motor according to claim 1, wherein coil axes around which the two parts of the electromagnetic coil extend respectively are prevented from being coaxial, and are distant from each other in at least one of the linear direction and the further direction.

12. A linear motor according to claim 1, wherein:

one of the parts of the electromagnetic coil of one of the first members is prevented from being adjacent to the other one of the parts of the electromagnetic coil of the one of the first members in the linear direction, and is adjacent to one of the parts of the electromagnetic coil of the other one of the first members in the linear direction, which part of the electromagnetic coil of the other one of the first members is prevented from being adjacent to the other one of the parts of the electromagnetic coil of the other one of the first members in the linear direction; and coil axes around which the parts of the electromagnetic coils of the first members extend respectively are prevented from being coaxial.

13. A linear motor according to claim 1, wherein when the magnetic core of each of the first members includes first and second magnetic core parts surrounded by respective parts of the electromagnetic coil, a pitch between the first and second magnetic core parts distant from each other in the linear direction in each of the first members is P, a number of phases differentiated from each other to electrically energize the respective electromagnetic coils of the first members is M, and k is a counting number, a distance between the first members adjacent to each other in the linear direction is calculated from the following formula, $k \cdot P + P/M.$

14. A linear motor for generating a motion in a linear direction, comprising:

a plurality of first members, each of which includes an electromagnetic coil for generating a first magnetic field, and a magnetic core having a gap between magnetic surfaces that are opposite to each other, so that the first magnetic field passes through the gap between the magnetic surfaces; and a second member which is arranged in the gaps of the respective first members, and is movable linearly relative to the first members to generate the motion in the linear direction, said second member including a magnet that is polarized in a polarizing direction to generate a second magnetic field;

wherein the electromagnetic coil of each of said first members and the magnet of said second member are disposed such that they cannot overlap each other in the polarizing direction, which is prevented from being parallel to the linear direction.

15. A linear motor for generating a motion in a linear direction, comprising:

a plurality of first members, each of which includes an electromagnetic coil for generating a first magnetic field, and a magnetic core having a gap between magnetic surfaces that are opposite to each other, so that the first magnetic field passes through the gap between the magnetic surfaces; and a second member which is arranged in the gaps of the respective first members, and is movable linearly relative to the first members to generate the motion in the linear direction, and said second member including a magnet that is polarized in a polarizing direction to generate a second magnetic field;

wherein the electromagnetic coil of each of said first members and the magnet of said second member are capable of overlapping each other at least partially as seen in a direction perpendicular to the polarizing direction, which is prevented from being parallel to the linear direction.

16. A linear motor for generating a motion in a linear direction, comprising:

a plurality of first members, each of which includes an electromagnetic coil for generating a first magnetic field, and a magnetic core having a gap between magnetic surfaces that are opposite to each other, so that the first magnetic field passes through the gap between the magnetic surfaces; and a second member which is arranged in the gaps of the respective first members, and is movable linearly relative to the first members to generate the motion in the linear direction, and said second member including a magnet that is polarized in a polarizing direction to generate a second magnetic field;

wherein a coil axis around which at least a part of the electromagnetic coil of each of said first members extends is prevented from extending perpendicularly to the polarizing direction, and said electromagnetic coil is disposed such that it cannot overlap the magnet in the polarizing direction.

17. An X-Y stage for driving an object, comprising, a first linear motor for driving the object in X-direction, and a second linear motor for driving the object in Y-direction, wherein each of the first and second linear motors for generating a linear motion in a linear direction, includes:

a plurality of first members, each of which includes an electromagnetic coil for generating a first magnetic field, and a magnetically permeable magnetic core having a gap between magnetic surfaces that are opposite to each other, so that the first magnetic field passes through a gap between the magnetic surfaces; and a second member which is arranged in the gaps of the respective first members, and is movable linearly relative to a combination of the first members to generate the linear motion in the linear direction, said second member including a magnet that is polarized in a polarizing direction to generate a second magnetic field; wherein, the electromagnetic coil of each of said first members includes two parts which are situated away from each other on the magnetic core;

the magnet of said second member and each of the two parts of the electromagnetic coil of each of said first members are disposed such that they cannot overlap each other in a further direction perpendicular to the linear direction; and the two parts of the electromagnetic coil are positionable opposite each other through the magnet as seen in the further direction.

* * * * *